US005421080A

United States Patent [19]

Bellavance et al.

[11] Patent Number: 5,421,080

[45] Date of Patent: Jun. 6, 1995

[54] MACHINE AND METHOD FOR MAKING FOR ASSEMBLING MULTICONDUCTORS AND A SUPPORT

[75] Inventors: Paul Bellavance, Lalanderon, Switzerland; James O. Davis, Sandy, Utah; Mark G. Metzger, San Jose, Calif.

[73] Assignee: Becton, Dickinson and Company, Franklin Lakes, N.J.

[21] Appl. No.: 14,914

[22] Filed: Feb. 8, 1993

Related U.S. Application Data

[62] Division of Ser. No. 524,105, May 16, 1990, abandoned.

[51] Int. Cl.[6] ........................ H01R 43/00; B23P 19/00

[52] U.S. Cl. ........................................ 29/825; 29/755; 156/436

[58] Field of Search ............... 29/33 F, 825, 755, 757; 156/436, 178, 55

[56] References Cited

U.S. PATENT DOCUMENTS

| | | | |
|---|---|---|---|
| 2,512,762 | 6/1950 | Benson et al. | 156/437 |
| 2,634,721 | 4/1953 | Greenwood . | |
| 2,976,865 | 3/1961 | Shipley . | |
| 3,480,083 | 11/1969 | Oleen | 166/275 |
| 3,545,275 | 12/1970 | Harrison . | |
| 3,624,714 | 11/1971 | Fraasrand | 73/398 |
| 3,654,380 | 4/1972 | Tatum et al. | 174/47 |
| 3,710,781 | 1/1973 | Hutchins, IV et al. | 128/2.05 |
| 3,748,623 | 7/1973 | Millar | 338/4 |
| 3,811,427 | 5/1974 | Kresse | 128/2.05 |
| 3,831,588 | 8/1974 | Rindner | 128/2.05 |
| 3,936,575 | 2/1976 | Watanabe et al. | 428/417 |
| 3,939,823 | 2/1976 | Kaye et al. | 128/2 S |
| 3,946,724 | 3/1976 | La Balme | 128/2.05 |
| 4,191,800 | 3/1980 | Holtzmann | 428/251 |
| 4,274,423 | 6/1981 | Mizuno et al. | 128/675 |
| 4,353,954 | 10/1982 | Yamaoka et al. | 428/216 |
| 4,407,693 | 10/1983 | Paquin | 29/755 |
| 4,610,256 | 9/1986 | Wallace | 128/675 |
| 4,647,508 | 3/1987 | Gazit et al. | 428/421 |
| 4,672,974 | 6/1987 | Lee | 128/673 |
| 4,722,348 | 2/1988 | Ligtenberg et al. | 128/675 |
| 4,722,761 | 9/1988 | Ibrahim et al. | 174/52 |
| 4,785,822 | 11/1988 | Wallace | 128/675 |
| 4,823,805 | 2/1989 | Wojcik | 128/736 |
| 4,825,876 | 5/1989 | Beard | 128/675 |
| 4,851,613 | 7/1989 | Jacques | 174/68.5 |
| 4,874,499 | 10/1989 | Smith et al. | 204/403 |
| 4,931,598 | 6/1990 | Calhoun et al. | 174/117 |
| 5,066,349 | 11/1991 | Perko et al. | 156/178 |

FOREIGN PATENT DOCUMENTS

| | | | |
|---|---|---|---|
| 2758491A1 | 7/1979 | Germany . | |
| 3305246C1 | 5/1984 | Germany . | |
| 63-269416 | 11/1988 | Japan | 156/55 |
| 273515 | 2/1951 | Switzerland . | |

*Primary Examiner*—P. W. Echols
*Attorney, Agent, or Firm*—Arthur D. Dawson

[57] ABSTRACT

A multiconductor and support has a plurality of elongate conductive elements each with a pair of termini. An elongate support means, carrying adjacent conductive elements, has openings located at the distal and the proximal ends for alignment with conductive elements extending thereover leaving the distal termini thereof unsupported. Heat activated adhesive on the support means bonds the conductive elements. Each of the conductive elements are spaced from the other conductive elements and have center lines which are parallel. A machine for assembly of a multiconductor and support means has a plurality of spools supplying conductive elements and a plurality of guides each positioned to receive and align the supplied conductive elements. The guides position the conductive elements spaced from and parallel to each other. A supply of support means moves support means intermittently but synchronously between the conductive elements and a flat surface. A heated platten compresses and bonds the conductive elements and the support means into an pair. A method for assembling a multiconductor and support includes intermittently moving several conductive elements in parallel spaced relation and intermittently moving a support means in a plane parallel to the conductive elements. Pressing the parallel conductive elements and the support means together forms the pair.

18 Claims, 10 Drawing Sheets

MACHINE AND METHOD FOR MAKING FOR ASSEMBLING MULTICONDUCTORS AND A SUPPORT

This is a divisional application of application Ser. No. 07/524,105, filed on May 16, 1990, now abandoned.

BACKGROUND OF THE INVENTION

1. Field of the Invention

This invention relates to a catheter or probe with a sensor for placement within a human or animal to allow direct monitoring within the body, and more particularly, relates to a flexible multiconductor and the support of a fine pitch thereof which connects the in vivo sensor to the ex vivo monitor by passing through a catheter lumen. A method of making such a multiconductor also relates to this invention.

2. Background

Catheters have been inserted into humans and animals for diagnosis, monitoring and treatment purposes and such catheters have to be small and flexible in size and structure in order to function without irritating the body part into which they are placed. Conductors used to transmit signals from the distal end to the proximal end of a catheter are in cross section smaller than the catheter lumen in order to be fed through the lumen. As circuit features on semiconductor devices and on active and passive monolithic electronic components continue to shrink and denser integrated circuit configurations are commercialized, microelectronic interconnect technology is being challenged to down-size fine pitch leads to keep pace with the smaller input/output port geometries on these chips. The densely packed porting pads of microchips enable electrical intercommuniation, via miniature mechanical links, between adjacent microelectronic devices, their support substrate and peripheral on-board microcircuit elements. As a result, interconnect lead pitches are approaching 0.10 mm on 0.05 mm wide terminals with 0.05 mm spaces.

If a sample of body fluid is removed from a patient by a catheter for purposes of analysis, the sample has to be taken to a laboratory, analysis made and the results transmitted to the doctor. Delay in performing the analysis and transmitting the data could be fatal to the patient. Significant advances have been achieved in providing continuous patient monitoring but most systems rely on ex vivo sensors. A use of a catheter and administration line is to provide a hydraulic column for transmitting pressure readings to an external sensor. Although there are many kinds of sensors capable of monitoring bodily functions, a commonly used sensor is for reading pressure. In connection with externally placed pressure sensors, the hydraulic column needed to transmit the signal has problems of air bubbles, kinks in the tubing about the column and blood clots, any of which could affect the reliability, the waveform fidelity and the accuracy and the precision of the signals.

An in vivo probe with a tip mounted sensor solves such problems and presents additional difficulties due to the reduced size of the sensor necessitated by the space available in the introducer used to penetrate small vessels in the body. The probe catheter should be about twenty gauge to provide an instrument for therapy or diagnosis which is easily inserted and easy to use without irritation or injury to the patient's vasculature. Twenty gauge catheters are commonly used on all but pediatric patients without problems of insertion or irritation when using such catheters, particularly, in connection with peripheral vessels. A pressure sensor on the distal tip of a twenty gauge catheter or probe would eliminate the need for a hydraulic column and the attendant difficulties.

Catheter tip pressure sensors have been relatively large in size, complicated in design, and costly to manufacture and use; therefore, such catheters have not been disposable. For preventing spread of disease and infection, an inexpensive and reliable single use catheter tip pressure sensor is desired. A design for a small, simple to manufacture catheter tip pressure sensor coupled with a design and method for making a multiconductor and support small enough to fit within the bore of a 20 gauge catheter would facilitate the development of a single-use catheter assembly for intra vascular blood pressure measurement.

Catheters with sensors at the distal tip thereof include U.S. Pat. No. 3,710,781 wherein a pair of elongate pressure sensor elements mounted on opposite sides of a support permit as large a sensor area as practical for purposes of providing accurate reproductions of blood pressure wave forms. U.S. Pat. No. 3,480,083 has an apparatus for measuring esophageal squeezing pressure; pressure sensitive sensors spaced lengthwise along and resiliently mounted on the catheter tube measure variations in pressure while the catheter is in or passing through the esophagus. The sensors are miniaturized discrete electronic components connected to a pressure responsive diaphragm and are supported within the tube by cylindrical holders fit therein to carry the exterior surface of the diaphragm. U.S. Pat. No. 4,772,761 has a sealed electrical circuit made on a metal stamping attached to a housing molded of a dielectric. The housing carries electronic components.

U.S. Pat. No. 3,545,275 has a device responsive to impedance used for measuring pressure with a miniaturized sensor. The sensor is responsive to diaphragm fluctuations where the diaphragm is mounted in the distal end of a small diameter tube. A small probe is disclosed in U.S. Pat. No. 3,811,427 wherein a pair of electrodes are mounted in a liquid filled chamber and are sensitive to fluctuations in a diaphragm mounted at the distal end of a catheter tube. The probe is said to be smaller than one millimeter. U.S. Pat. No. 4,874,499 has a microchip sensor capable of measuring a variety of chemicals at once. The sensor has materials that develop electrical charges in the presence of the specific chemical, like potassium or calcium.

U.S. Pat. No. 4,274,423 shows a catheter tip pressure transducer electrically connected by a series of parallel wires, no structure for the wire or cable is disclosed. U.S. Pat. No. 4,610,256 appears to have a cable composed of a plurality of wires in a channel which runs through a molded plug and communicates with the atmospheric pressure. U.S. Pat. No. 4,722,348 discloses conductors which extend through the lumen of a catheter to a power supply and detector circuit. The transducer is held to the catheter by a tape and an opening is provided to expose the bonding pads on the semi-conductor so that electrical connections can be made with the conductors on the pad and the conductors passing through the lumen of the catheter.

U.S. Pat. No. 3,748,623 teaches a first conductor soldered to one side of a pad and a second conductor connected to an end pad. A third conductor is attached to a common junction with wire to the upper and lower faces of the end pad. While a pressure transducer on the end of a catheter with wiring running therethrough is disclosed, the use of a multiconductor and support is not. Similarly, U.S. Pat. No. 4,672,974 has electrical leads run through the catheter to external electronics. A cable sheath is provided for protection of the leads and an air vent can be included for a reference. U.S. Pat. No. 4,785,822 shows a reinforced cable using a stylet to give the cable desired rigidity for insertion. The wires in the cable are not supported in any particular fashion.

U.S. Pat. No. 3,946,724 shows connecting wires which run along a groove and attach to electrical conductors. The wires are only mounted in the support for the transducer. U.S. Pat. No. 3,939,823 shows electrical connections passing through the catheter lumen and a hollow tube to provide an air path to supply atmospheric reference pressure. U.S. Pat. No. 3,831,588 shows insulated wires connected to terminals of the sensor and the terminals of a plug while hermetically sealed to the exterior of a tube, pairs of wires are grouped together on a conduit such that there are two independent supports for each pair. U.S. Pat. No. 3,710,781 discloses wire passages communicating with the tubular shank of a support for the sensor. No support for the wires is shown in the lumen of the catheter.

U.S. Pat. No. 3,624,714 discloses wires held in place by epoxy which fills the entire cavity of the bore and an insulator bracket is inserted into a bore with a larger diameter and held in place by an interior shoulder at the junction of the larger and smaller bore diameters. The proximal end of the cable has insulated wires stripped back from the ends to expose the metal conductors for solder connections to the strain gauge and an L-bracket holds them spaced from one another for easy connection to the strain gauge leads. U.S. Pat. Nos. 2,976,865 and 2,634,721 show a plurality of conductors imbedded in the wall of a catheter.

U.S. Pat. No. 4,823,805 has a catheter tube with passages for a strain relief and for a pair of insulated wires; no self supporting cable is disclosed. A multiconductor lead having four conductors for carrying the signals from a solid state pressure transducer to a modular connector is described in U.S. Pat. No. 4,825,876. The multiconductor is stripped so the stranded wires can be tinned and soldered. That multiconductor is ex vivo as the sensor is of the external type. Consequently, the size of the multiconductor is not a significant element of that design.

Flexible printed circuits, disclosed in U.S. Pat. No. 3,936,575, suitable as a compact three dimensional chip include a metal clad laminate used to carry integrated circuits and capacitors and a fibrous based material with, for example, glass fabric which provides stiffness, chemical and heat resistance and dimensional stability to the resin film to which a metal foil is clad. The resin composition used to form the flexible, chemical and heat resistance base sheet is specifically disclosed in the '575 patent. A sheet or multiple sheets of resin is laminated to a copper, aluminum, tin, nickel or copper foil with an adhesive layer therebetween. The preferred foil thickness is about 0.05 to about 0.08 millimeters and the resin sheet is approximately 0.03 to 0.5 millileters thick.

U.S. Pat. No. 4,191,800 has a process for making electronic devices with a flexible double sided substrate having impregnated cloth or matting material with a resin composition and copper sheet attached to both sides. Of primary concern is the particular resin composition and not necessarily the size and flexibility of the device.

U.S. Pat. No. 4,353,954 has a dielectric resin coated in the wet state on the surface of a metal foil and dried to form an adhered coating without an adhesive between foil and the coating thus simplifying the manufacture by eliminating the adhesive and the pressing required to make the combination. U.S. Pat. No. 4,647,508 uses an adhesive between the flexible substrate and the conductor. The adhesive is loaded with glass to improve dimensional stability and lower the dielectric. A microglass reinforces a fluoropolymer in the adhesive between a fluoropolymer coated polyimide laminate and a copper conductive pattern.

U.S. Pat. No. 4,851,613 provides a flexible circuit board, to which components may be surface mounted, having substrates or layers of conductive materials and insulating layers. The substrates are reinforced with a woven fabric and the insulating layers have a plurality of rectangular insulating elements, each with their longer dimension transverse to the length of the substrate and spaced apart to define fold lines.

Not one of the flexible circuit configurations mentioned has a construction which would provide an extremely fine multiconductor and support useful for directly transmitting a signal from the distal to the proximal end of a long in vivo catheter. An extremely strong, but longitudinally elongate miniature multiconductor and support has not been disclosed. Consequently, assembly of a sensor in a catheter has been expensive, slow and labor intensive because of difficulties when threading wires that are separate through a lumen of the catheter for connecting the appropriate sensor pads to ex vivo circuitry.

SUMMARY OF THE INVENTION

A preferred embodiment of a multiconductor and support may have a plurality of elongate conductive elements with termini at the opposite extremities, Each conductive element is formed about a center line axis and extends therealong spaced from the other conductive elements, The multiconductor and support is preferably flexible and has a fine pitch or slight spacing between the conductive elements, The respective center lines are located in generally parallel relation along the elongate dimensions of the conductive elements so that their termini at the opposite extremities are adjacent. An elongate support means has a distal end and a proximal end with an intermediate part therebetween and the elongate support means carries adjacent conductive elements for maintaining the generally parallel and spaced relationship therebetween, The support means also provides the axial or longitudinal strain relief for the multiconductor and support. The strain relief may be part of the support means or if desired added thereto as one or more longitudinally placed additional filaments of high tensile strength material or the like, The support means may have metallizing thereon to act as interference shielding.

A plurality of openings is most preferably located in and pass through the elongate support means at the distal and the proximal ends. Included are openings aligned with the conductive elements extending thereover for leaving the termini thereof unsupported. The elongate support means may be a strip of dielectric polymer with a pair of major surfaces on which the conductive elements are attached, to which preferably the conductive elements are adhered to at least one of the major surfaces. Additional openings can be provided and used for feeding the strip during its assembly with the conductive elements and for purposes of registration.

The strip may preferably have an adhesive on the major surface to which the conductive elements are attached and a metallic layer, if desired, may be applied to the opposite major surface. The conductive elements may have a cross section of a parallelepiped or can be circular in cross section. The conductive elements may be covered with insulation. A plurality of elongate spacers may alternately be the support means. The spacers may be of a dielectric material and may be arranged with each spacer positioned between the adjacent conductive elements to maintain the generally parallel relation therebetween. The elongate spacers extending between the proximal and distal ends of the conductive elements are preferably spaced therefrom to leave open and unsupported the termini of the conductive elements. The spacers may, if preferred, have a circular cross section and one or more of the spacers could be a hollow tube or a reinforcing filament. The conductive elements may have a circular cross section and the circular spacers can be of a different diameter than the conductive elements to ensure consistent spacing of the dimensions between adjacent bonding pads on the selected sensor chip. Spacers of a square cross section may be an alternate embodiment.

Another part of the invention is a machine, for the assembly of the multiconductor and Support, having a plurality of spools on parallel axes. Each spool has a supply of conductive elements wrapped thereabout. A plurality of guides are positioned to receive conductive elements from a spool and to pass the conductive elements to a plane. The spools are biased to maintain a predetermined tension on the conductive elements as they are fed through the plane. The conductive elements move in the plane intermittently and periodically so that a section of conductive elements overlies a flat surface and is spaced therefrom. The guides also position the conductive elements spaced from and parallel to each other.

A supply of support means is transported between the conductive elements and above the flat surface. Each support means moves intermittently but synchronously with the conductive elements in the plane thereabove so that the support means and the conductive elements are periodically motionless and in registration with each other for forming a pair. In the preferred embodiment of the machine, a platten is disposed above the conductive elements and is mounted for reciprocal motion to and from the periodically motionless conductive elements and support means to compress them into a pair. The flat surface resists the pressure of the platten thereby bonding the pair.

When the support means is a polymer tape with a heat activated adhesive, the platten may be heated. The supply for the support means may include means for making openings. The pair is positioned in registration whereby the openings in the support means provide a place whereat the conductive elements are unsupported. Additional openings are, as explained, provided for movement and in the support means for controlling the registration thereof relative to the conductive elements. A cutter may be arranged to transversely sever the place where the conductive elements are unsupported for making individual multiconductor and supports.

A method for assembling a multiconductor and support is another part of the preferred embodiment. The methods include intermittently moving several conductive elements in parallel spaced relation in a plane and intermittently moving a support means in another plane positioned parallel to the plane of the conductive elements. The method has the step of pressing the parallel conductive elements and the support means together to form an assembly thereof when the conductive elements and the support means are periodically motionless in their respective planes.

The method may include severing individual assemblies of conductive elements and support means. The method may be altered wherein the step of pressing includes heating a heat activated adhesive carried on the support means. Additionally, the step of overcoating the conductive elements might be used to form an insulative layer. The step of pressing is preferably performed by reciprocating a platten against the support means and toward a flat surface to form the pair. The step of heating the platten is used for activating adhesive on the support means for securing the conductive elements thereto. Intermittently moving the conductive elements in the plane in parallel spaced relation relative to one another is the step performed after guiding the conductive elements from a plurality of spools into parallel spaced relation.

Intermittently moving the support means in another plane parallel to the plane of the conductive elements is a step which may preferably be performed by intermittently feeding the support means dispensed from a roll of polymer tape. For providing registration for the handling of the tape, the step of making openings in the tape follows dispensing the polymer tape. Locating the openings in the support means at the termini of the conductive elements provides unsupported portions of conductive elements. The step of severing the assembly transversely across the openings and across the unsupported portions of the conductive elements leaves the conductive elements ready to be connected in a circuit.

Additional openings in the tape at the edges are used to advance the tape during assembly. The excess tape material can be trimmed by cutting with a laser or a knife to the desired minimal width. The tape used as the support means is most preferably slightly wider than the supported conductive elements so the multiconductor and support when trimmed will be no wider than the conductors at the edges. If a laser is used to trim, a metallized layer, on the major surfaces of the support means opposite the surface to which conductive elements are mounted, can be used as a template to define the precise area of cutting and mask the support means material that must remain. The trimmed assembly can also have another insulating layer overlaid atop the conductive elements; metallizing may be applied thereover as shielding.

As an alternate the tape can start as a double width which is folded in half to overlie the conductive elements. Longitudinally trimming excess tape to reduce the transverse dimension of the assembly is a step in the method which reduces the size of the assembly. When forming openings, the additional openings may be made for movement and registration of the tape relative to the conductive elements. The openings may be used for alignment of the tape when trimming to the transverse dimension of the assembly. The folded support means can be externally metallized as a shield; metallizing is preferably accomplished before the conductive elements are attached. The metallic shield may be applied to the support means by vapor deposition. The shielding acts to minimize inductive interference with the signals transmitted by the conductive elements.

The preferred application for the multiconductor and support disclosed herein is an in vivo pressure monitoring probe in a catheter. It may also be used for a variety of high density microsensor and microelectronic packaging needs wherein low weight, long span, high flexibility, high current carrying capability and minimal space are critical to the need to transmit electrical energy or other signals through conductors. The equipment for making the multiconductor and support has the capability to assemble various cross sectional and longitudinal geometric arrangements of conductors and support means notwithstanding their intended ultimate use,

DETAILED DESCRIPTION

Figure 1:
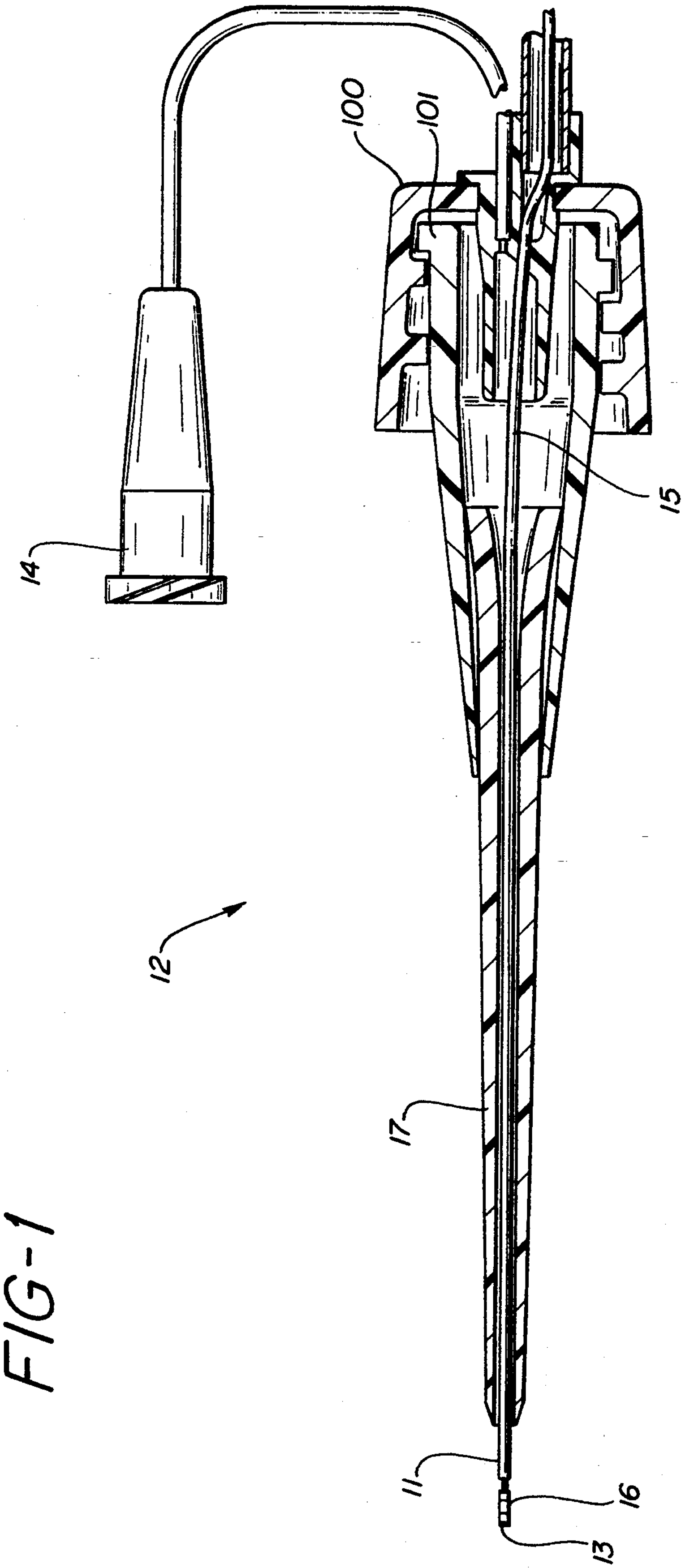
FIG. 1 is an overall plan view of the preferred embodiment of an assembly of the catheter tip pressure sensor with the multiconductor and support, which extends between a sensor and a connector for taking blood samples and passes through a tube connecting the sensor and the connector to convey the signals from the distal end of the catheter to a monitor.

While this invention is satisfied by embodiments in many different forms, there is shown in the drawings and will herein be described in detail a preferred embodiment and alternatives of the invention, with the understanding that the present disclosure is to be considered as exemplary of the principles of the invention and is not intended to limit the invention to the embodiment illustrated. The scope of the invention will be measured by the appended claims and their equivalents.

The preferred multiconductor and support 10 are a part of a sensor tip assembly 11 shown in FIG. 1, an overall plan view of the catheter pressure assembly 12 including the multiconductor and support 10 extending from a pressure sensor 13. The multiconductor and support 10 extend through a tube 15 between the sensor 13 and an electrical connector (not shown) to convey electrical signals to a monitor such as a cathode ray tube. The catheter pressure assembly 12 may have a sensor support member 16 with a passage in the member 16 so that the sensor is carried upon and covers the passage and the passage side of the sensor 13 is at ambient pressure while the other side of the sensor 13 is exposed to the in vivo pressure.

The multiconductor and support 10 attach to an area of the sensor 13 near the passage in the member 16 for transmitting signals from the sensor 13 through the tube 15. The catheter pressure assembly 12 is described and claimed; in U.S. Pat. No. 4,994,048 and the member 16 is described and claimed in U.S. Pat. No. 5,050,297; the disclosures of those patents are incorporated herein by reference.

The catheter pressure assembly 12 cooperates by a luer attachment 100 with an introducer catheter 17 having a distal lever adapter 101 to permit insertion and thereafter sampling or infusion of medication into the patient. More specifically, the introducer catheter 17 is placed into the patient by use of an over the needle procedure and the needle (not shown) is withdrawn, and removed and discarded. The sensor tip assembly 11 is then inserted through the placed introducer catheter 17 and into the patient's body and if for blood pressure, the vasculature. The multiconductor and support 10 passes from the sensor 13 through the sensor tip assembly 11 and is within tube 15 separated from the fluid flowing between introducer catheter 17 and the sensor tip assembly 11 carried therein, as shown in FIG. 1.

Figure 2:
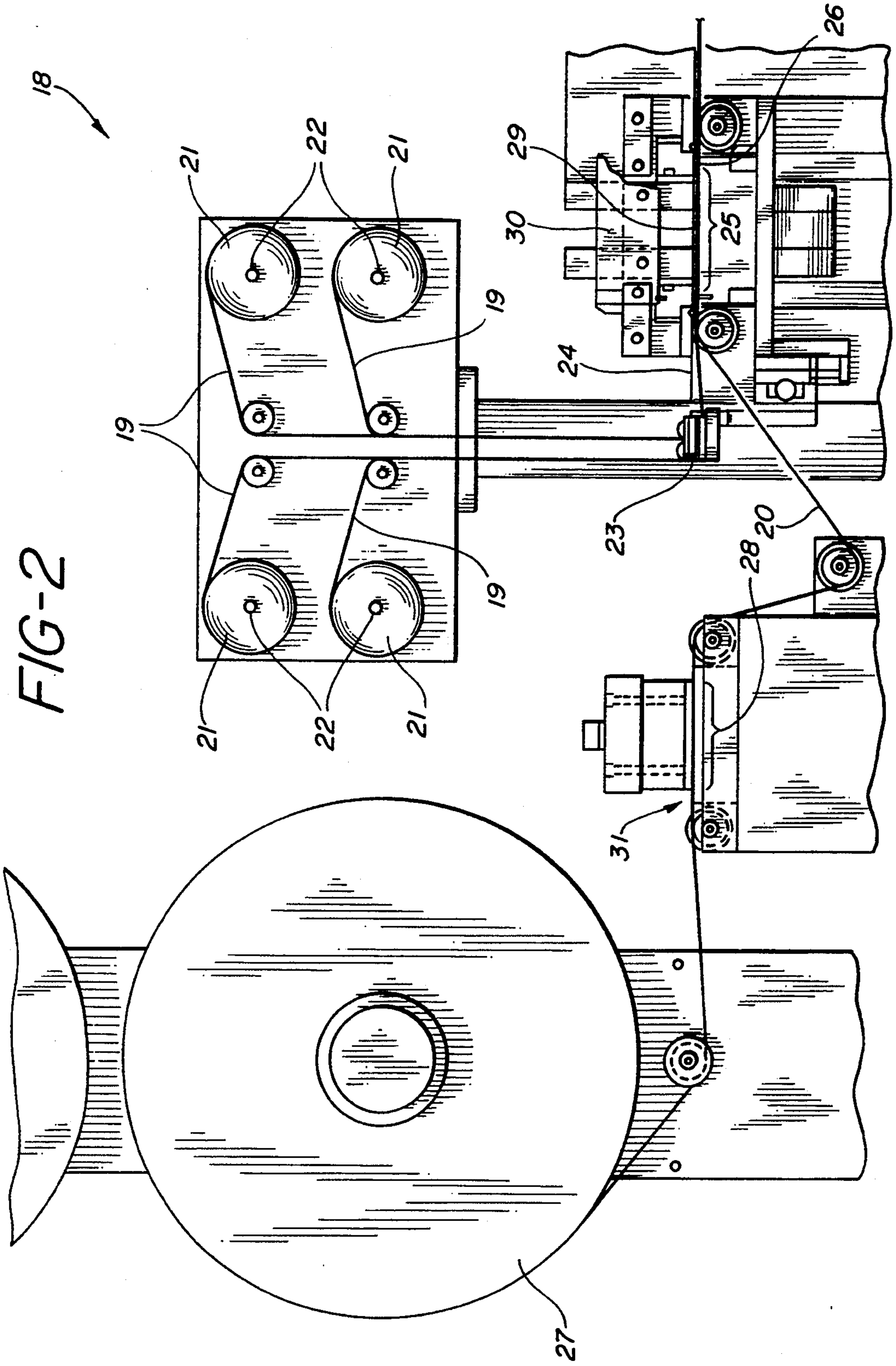
FIG. 2 is a front elevational view of a preferred embodiment of a machine for assembling a multiconductor and support showing the mechanisms for supplying, guiding, aligning and bonding the conductive elements to the support means.

Shown in FIG. 2 is a front elevational view of the preferred embodiment, machine 18 for assembling the multiconductor and support 10 includes the mechanism for supplying, aligning and bonding conductive elements 19 and a support means 20. The machine 18 for assembling a multiconductor and support 10 has a plurality of spools 21 which are each carried for rotary movement about parallel axes 22. Each spool 21 has a supply of conductive elements 19 wrapped thereabout. A plurality of guides 23 are located on the machine 18 and are disposed to cooperate with the conductive elements 19 supplied from the spools 21. Each of the guides 23 is associated with a spool 21, see also FIG. 3, so that each guide 23 is positioned to receive supplied conductive elements 19 and to pass conductive elements 19 through a plane 24. The machine 18 provides periodically a section 25 of the conductive elements 19 to be in overlying relation to a flat surface on the machine 18 and to be spaced therefrom. The spools 21 are biased to maintain a predetermined tension on the conductive elements 19 which are supplied to the plane 24 with intermittent movement.

The guides 23 for the spools 21 are arranged to position the sections 25 of conductive elements 19 spaced from and parallel to other sections 25 of conductive elements 19 similarly positioned by other such guides 23 whereby the conductive elements 19 are located in the plane 24 spaced from and overlying a flat surface 26. A supply 27 in the form of a roll, of support means 20 is transported between the plane 24 of the conductive elements 19 and above the flat surface 26. The support means 20 are moved intermittently and synchronously with the parallel conductive elements 19 thereabove so that a part 28 of the support means 20 and the conductive elements 19 are periodically motionless and in registration with each other.

The motionless support means 20 and the conductive elements 19 can be formed into a pair 29 by the machine 18. A platten 30 carried on the machine 18 is disposed above the conductive elements 19 and over the flat surface 26. The platten 30 is mounted for reciprocal motion to and from the periodically motionless pair 29 to compress them against the flat surface 26 for bonding. The platten 30 and/or the flat surface 26 can be heated when the support means 20 is a polymer tape. As will be described herein, the pair 29 is preferably very fine, thin and thread-like with a much greater length than width. The particular preferred embodiment easily fits within a circular space of 0.40 mm diameter and may be over a decimeter in length.

Although flexible, fine line interconnect strips such as TAB ("tape automated bonding") can be formed to produce a 0.10 mm pitch, this dense pitch is only maintained over a very short length, typically under 2 mm, before the conductive traces fan out into broader, higher yielding geometries. Efforts to increase tight pitch interconnect spans using the TAB flexible circuit method has not been achieved. TAB and related "flex" interconnect methods rely on a photolithographic manufacturing process and their span is limited by the exposure field of the imaging equipment. Available exposure chambers range from 10 cm to 30 cm in length. TAB interconnect tape is manufactured using a multiprocess, subtractive, photoforming technique which yields an expensive unit cost that is not acceptable for a disposable assembly.

Another technical inconvenience that emerges in using TAB interconnects relates to the bonding pads on the microchip. These need to be "bumped" or built-up with additional metallization to ensure reliable low resistance connection after TAB attachment. This "bumping" and TAB interconnect process adds additional expense to the manufacture of the chip, presents a possible resistance or delay to the passage of a low level, high power or high frequency signal and poses a serious handling hazard to semiconductor wafers, especially fragile, micromachined silicon devices such as microsensors which are very delicate, sculptured wafers.

In vivo physiological microsensors need to transmit signals over long distances for ex vivo use. A cardiac monitoring application requires an average interconnect span of 60 cm. Important attributes of a microsensor probe are low cost, ruggedness and small diameter. The ideal microprobe interconnect should be easily made in any length, match the high density bonding pad pitch of the chip along its entire span, be able to be truncated to form bonding termini anywhere along the span, provide the tensile integrity for the probe and double as the material handling means for subsequent, additive assembly steps.

In FIG. 2, the supply 27 includes means for making openings 31 in the support means 20, the openings 32 are for registration and to define areas to cut the conductive elements 19 and trim the support means 20. Specifically in FIGS. 21 and 22, the pair 29 is arranged so that the openings 32 in the support means 20 provide a place 33 where the conductive elements 19 are unsupported and another place 34 for controlling the registration of the support means 20 relative to the parallel spaced apart conductive elements 19. A cutter (not shown) is arranged to sever the place 33 where the conductive elements 19 are unsupported for separating an individual multiconductor and support 10. The cut is transverse to the elongate dimension of the multiconductor and support 10 and preferably made across the place 33 of openings 32 in the support means 20. The conductive elements 19 are left free and unsupported by the support means 20 for the purpose of making connections after the cut. In the preferred arrangement the conductive elements 19 are conducted to the sensor 13 at one of the distal termini 35. With transverse cutting a proximal termini 35 results; the conductive elements 19 thereat overlie the support means 20 and are not bonded thereto.

The multiconductor and support 10 comprise a plurality of conductive elements 19 each having an elongate shape about a center line 36 thereof. Each conductive element 19 extends along its center line 36 and is spaced from the other conductive elements 19 with their respective center lines 36. All the conductive elements 19 are most preferably located in generally parallel relation along their elongate dimensions so that the termini of the conductive elements 19 at the opposite extremities are adjacent as in FIGS. 5 through 17, 21 and 22.

The elongate support means 20 has a distal end 38 and a proximal end 39 with an intermediate part 40 therebetween and carries adjacent conductive elements 19 maintaining the generally parallel and spaced relationship therebetween. In one embodiment shown in FIGS. 21 and 22, a plurality of openings 32, located on and passing through the elongate support means 20 are at the distal and the proximal ends 38 and 39, at each opening 32 is used to determine the termini 35 of the conductive element extending thereover. The openings 32 are positioned relative to the respective conductive elements 19 for leaving them unsupported for easy connection with the sensor 13.

The cross sections of various embodiments of elongate support means 20, shown in FIGS. 11 through 17, includes a strip 41 of dielectric polymer tape such as polyimide which is most preferably about 0.025 mm thick and up to 13 mm wide before trimming. The tape has a pair of major surfaces 42 and 43 and the conductive elements 19 are preferably attached to one of the major surfaces 42. Alternatively a metallic shield or additional conductor 44 may be applied to the major surface 42 opposite that to which all the conductive elements 19 are adhesively bonded. Metallic shielding can be added to any of the configurations but is only shown by way of example in FIGS. 13 and 14. The conductive elements 19 may be made of any conductive substance such as copper, aluminum or gold and the metallic shield or additional conductor 44 may be applied to the strip 41 by any technique, such as cladding, vapor deposition, metal sputtering, plating, spraying or the like. Depending upon the manner of making and the material of the conductive elements 19, they may have a parallelepiped cross section or a circular cross section. The conductive elements 19 may also be covered with an overcoat of insulation such as a polymer dielectric applied by dipping, spraying or by application of an additional strip. Metallic shielding 44 may also be included on the overcoat 45, if desired.

Figure 3:
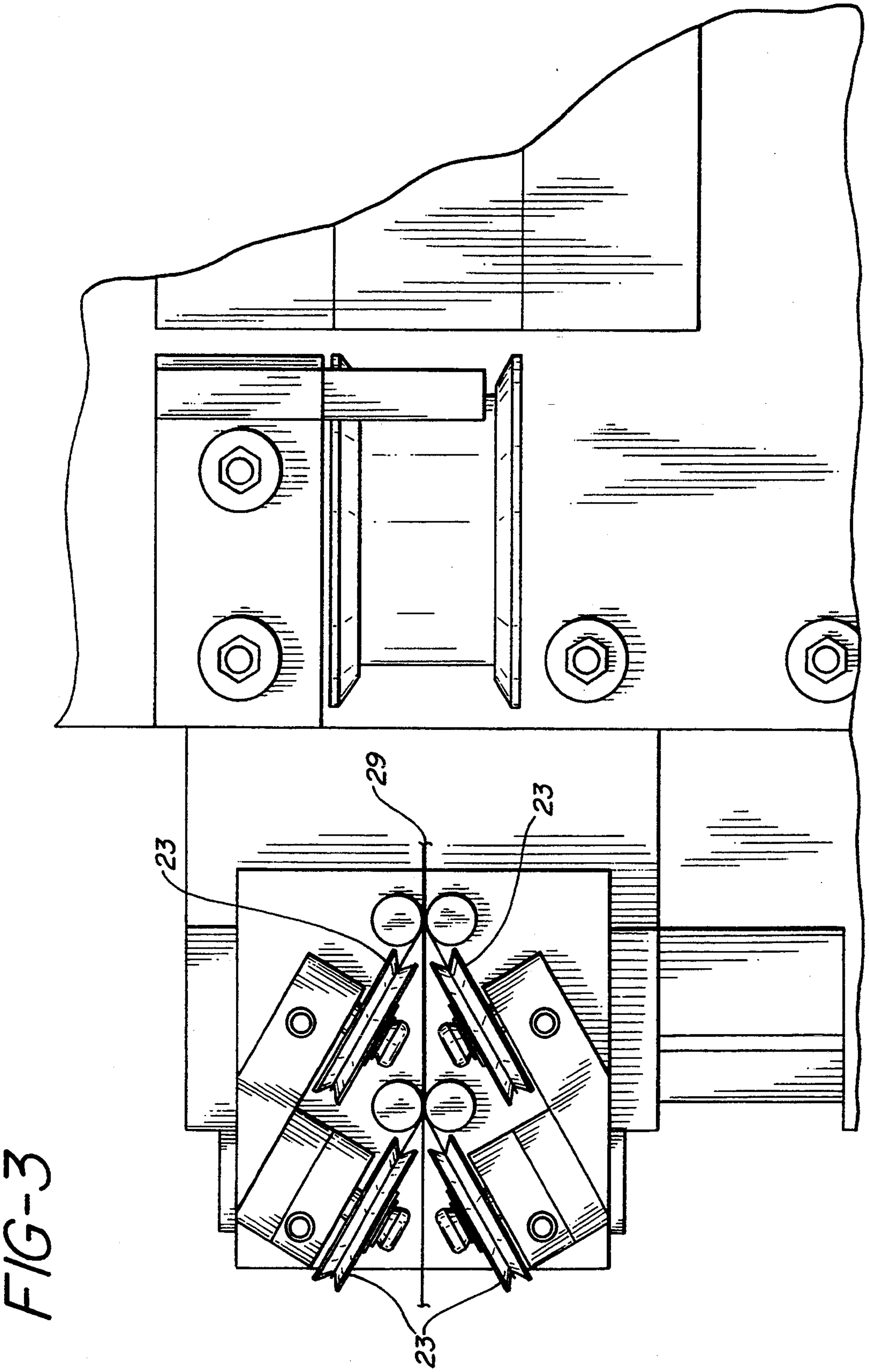
FIG. 3 is a top plan view of the preferred embodiment of the machine of FIG. 2 showing the guides for positioning the conductive elements in parallel spaced relation to one another.

The elongate support means 20 may alternatively include a plurality of elongate spacers 46 of a dielectric material such as Teflon polymer rod, glass, polyaramid or other reinforcement filament or tubing of circular cross section as shown in FIGS. 5 through 10. The conductive elements 19 might have a circular cross section and be used with spacers 46 of the same or a smaller diameter than the conductive elements 19, see for example FIG. 10. Alternatively the spacers 46 could be of square or rectangular cross section. For purposes of transmitting ambient air pressure to the passage under the sensor 13 one or more of the spacers 46 may be a hollow tube. Each spacer 46 is positioned between the adjacent conductive elements 19 to maintain the generally parallel relation therebetween. The elongate spacers 46 extend between the proximal and distal ends 38 and 39 but are spaced therefrom to leave open the termini 35 of the conductive elements 19. While the machine 18 of FIGS. 2 and 3 is shown for the fabrication of the multiconductor and support 10 of FIGS. 11 through 17 the multiconductor and support 10 of FIGS. 5 through 10 requires another type of fabrication as regards the provision of open termini 35. For example, the spacers 46 can be brought together with the conductive elements 19 as described.

Figure 13:
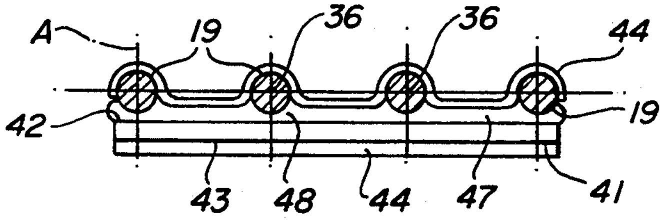
FIG. 13 is a view in cross section of another form of the multiconductor and support with the parallel spaced apart conductive elements having a circular cross section and in a manner similar to FIG. 11 being adhesively bonded to the support means in the form of a strip and also overcoated with an insulative layer.

In the preferred embodiment the elongate support means 20 is the strip 41 of dielectric polyimide polymer film and the conductive elements 19 are aluminum wires overcoat 45 with another dielectric film bonded to the strip 41, as in FIG. 13. The strip 41 has a heat activated adhesive 47 for forming a bond between the strip 41, the dielectric film and the conductive elements 19 by melting at an interface 48 therebetween. The strip 4i can support a metallic shielding or additional conductor 44 on the surface 43. Additional openings 49 may be provided along the strips 41 periphery or edge for feeding and/or advancing the strip 41 during assembly with the conductive elements 19 as shown in FIGS. 21 through 24. The tape has adhesive 47 such as a hot melt wax on the major surface 42 to which the conductive elements 19 are attached. If the conductive elements 19 are attached to both major surfaces 42, as is shown, for example in FIGS. 16 and 17 then the adhesive 47 is on both major surfaces 42 and 43.

Figure 4:
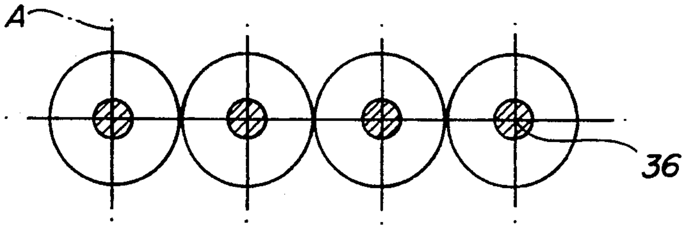
FIG. 4 is a view of a typical currently available multiconductor shown in cross section wherein heavily coated insulated conductive elements are solvent bonded together to form a multiconductor.

Another part of the invention is shown in cross section in the various alternate configurations of the multiconductor and support 10 as in FIGS. 5 through 17. In FIG. 4 the current technology which is readily available but is too big for use in space available in a catheter of 20 gauge or less. Current technology has a plurality of heavily coated insulated conductive elements 19 which are typically solvent bonded together to form a flat cable as shown in FIG. 4. To place in perspective the relative size of that arrangement, the relative scale of the current technology in FIG. 4 and the various examples of the multiconductor and support 10 are arranged in the FIGS. 4 through 10 with the center line 36 or axis of the conductive element 19 on the left side positioned along a vertical line A with the center line 36 of each embodiment of the invention as shown in the FIGS. 5 through 17. While FIG. 4 is not shown on the same sheet as FIGS. 11 through 17, vertical line A is for purposes of comparison.

In particular, the need is to minimize the cross sectional area of the multiconductor and support 10 so that the size of the catheter lumen necessary to permit easy threading and in vivo placement of sensor 13. Consequently, the signal sensed at the in vivo sensor 13 on the distal end 38 of the multiconductor and support 10 is provided to an ex vivo monitor. The arrangements illustrated in FIGS. 5 through 17 can be manufactured on the machine 18 of FIGS. 2 and 3 with slight adjustments in the components thereof to accommodate the various cross sections of the support means 20 and conductive elements 19. Similarly, the number of conductors and/or the length of the pair 29 may be increased or reduced as required without departing from the claimed invention. While only the cross sections are shown in FIGS. 5 through 17, the length of the multiconductor and support 10 can be as desired and of any elongate dimension even though the transverse dimension is thread-like.

Figure 5:
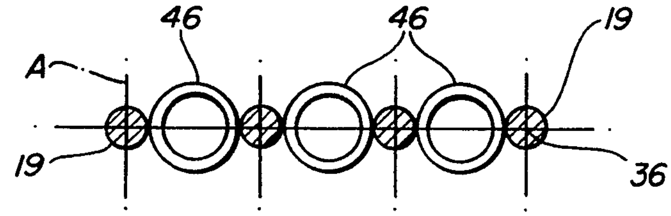
FIG. 5 is a view in cross section of one form of the multiconductor and support of the present invention with parallel and spaced apart conductive elements assembled to the support means positioned between adjacent conductors.

FIG. 5 is a cross sectional view of one of the several alternate forms of the multiconductor and support 10 of the present invention with parallel and spaced apart conductive elements 19 assembled to support means 20 between adjacent conductor elements 19. The support means 20 although shown throughout the various views as solid can, as mentioned, be hollow for carrying fluids or for other forms of communications. The dimensions of the preferred configuration are in the range of 0.03 mm to 0.04 mm for the diameter of each conductive element 19. The support means 20, in the form of spacers 46, is about. 0.08 mm in diameter. The multiconductor and support 10 is 0.08 mm thick and the transverse dimension is 0.36 mm.

Figure 6:
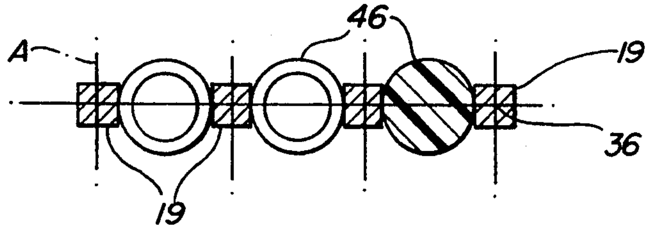
FIG. 6 is a view in cross section of another form of the multiconductor and support of the present invention similar to FIG. 5 but with the conductive elements having a different cross sectional configuration.

FIG. 6 is a cross sectional view of another of an alternate form of the multiconductor and support 10 of the present invention which is similar to FIG. 5 but has conductive elements 19 of circular cross section and the support means 20 in the form of spacers 46 with square cross section. The dimensions of the preferred configuration are in the range of 0.03 mm to 0.04 mm wide for each conductive element 19 and each support means 20 is about 0.08 mm in diameter. The transverse dimension is 0.36 mm and the multiconductor and support 10 is 0.08 mm thick.

Figure 7:
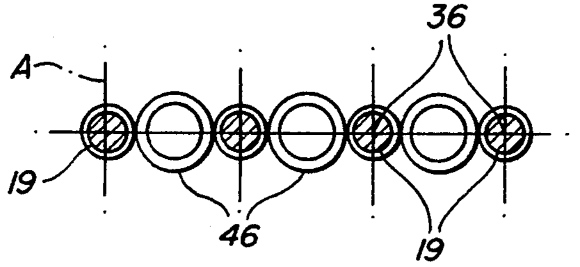
FIG. 7 is a view in cross section of an additional form of the multiconductor and support of the present invention with parallel and spaced apart insulated conductive elements assembled to the support means between adjacent conductors.

FIG. 7 is a cross sectional view of an additional alternate form of the multiconductor and support 10 of the present invention with parallel and spaced apart insulated conductive elements 19 assembled to support means 20 between adjacent conductive elements 19. The dimensions of the preferred configuration are in the range of 0.03 mm to 0.05 mm for the diameter for each insulated conductive element 19 and each spacer is about 0.06 to 0.08 mm in diameter. The transverse dimension is 0.32 mm and the height is about 0.06 mm thick.

Figure 8:
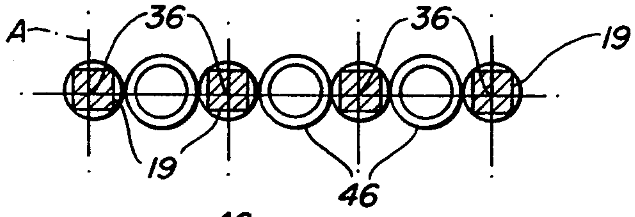
FIG. 8 is a view of cross section another form of the multiconductor and support of the present invention similar to FIG. 7 but with the conductive elements having different cross sectional shape.

FIG. 8 is a cross sectional view of another modified form of the multiconductor and support 10 of the present invention similar to the alternate form of FIG. 7 but with the conductive elements 19 having a square cross sectional shape which is insulated so that a circular cross section results. The dimensions of the preferred configuration are in the range of 0.03 mm to 0.05 mm for the diameter of each conductive element 19 and the support means 20, in the form of a spacer 46, is about 0.08 mm in diameter. The transverse dimension is 0.30 mm and the thickness or height is about 0.06 mm.

Figure 9:
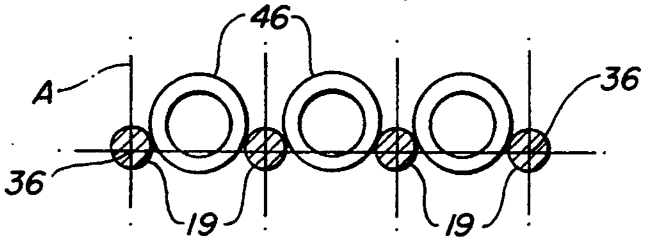
FIG. 9 a view in cross section of another form of the multiconductor and support of the present invention similar to FIG. 5 with the conductive elements and the support means, wherein the axes of the conductive elements are offset relative to the plane of the axes of the support means to reduce the width of the combination.

FIG. 9 is a cross sectional view of yet another alternate form of the multiconductor and support 10 of the present invention similar to FIG. 5 but having the conductive elements 19 and the support means 20 with offset axes to reduce the overall width of the pair 29. The dimensions of the preferred configuration are in the range of 0.03 mm to 0.05 mm for the diameter of each conductive element 19 and the support means 20 is about 0.08 mm in diameter. The multiconductor and support 10 is about 0.08 mm thick and the transverse dimension is 0.34 mm.

Figure 10:
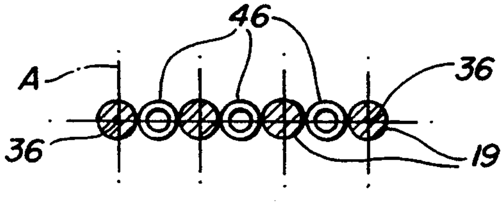
FIG. 10 is a view in cross section of another form of the multiconductor and support with the parallel spaced apart conductive elements having a circular cross section and being adhesively bonded to support means in the form of spacers of a circular cross section and the same diameter as the conductive elements.

FIG. 10 is a cross sectional view of still another alternate form of the multiconductor and support 10 with the parallel spaced apart conductive elements 19 having a circular cross section and being adhesively bonded to a support means 20 in the form of circular spacers 46 of the same diameter as the conductive elements 19. This particular form of the invention is the preferred embodiment when spacers 46 are used as the support means 20. The dimensions of the preferred configuration are in the range of 0.025 mm to 0.05 mm for the diameter of each conductive element and the spacers 46 are about 0.025 mm to 0.05 mm in diameter. The multiconductor and support 10 is about 0.025 mm thick and the transverse dimension is 0.18 mm This particular combination of multiconductor and support 10 has the smallest cross sectional configuration.

Figure 11:
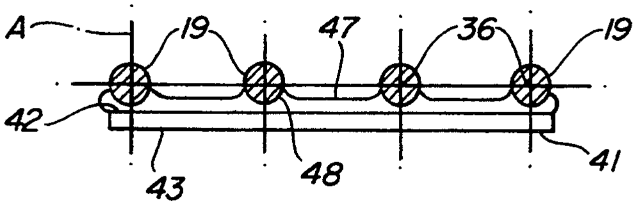
FIG. 11 is a view in cross section of another form of the multiconductor and support with the parallel spaced apart conductive elements having a circular cross section and being adhesively bonded to a support means in,the form of a strip.

FIG. 11 is a cross sectional view of another preferred form of the multiconductor and support 10 with the parallel spaced apart conductive elements 19 having each a circular cross section and being adhesively bonded to a support means 20 in the form of a strip 41. The dimensions of the preferred configuration are in the range of 0.025 mm to 0.05 mm for the diameter of each conductive element 19 and the support means 20 is about 0.025 mm thick and about 0.40 mm wide. The transverse spacing between the spaced apart conductive elements 19 is approximately 0.075 mm. The multiconductor and support 10 is about 0.050 mm thick and the transverse dimension is 0.34 mm.

Figure 12:
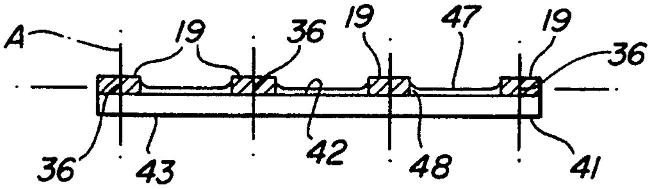
FIG. 12 is a view in cross section of another form of the multiconductor and support with the parallel spaced apart conductive elements having a rectangular cross section and being adhesively bonded to a support means in the form of a strip.

FIG. 12 is a cross sectional view of another alternate form of the multiconductor and support 10 with the parallel spaced apart conductive elements 19, each having a rectangular cross section and being adhesively bonded to a support means 20 in the form of a strip 41. The dimensions of the preferred configuration are in the range of 0.013 mm thick and 0.038 mm wide for each conductive element 19 and the support means 20 is about 0.025 mm thick and about 0.40 mm wide. The transverse spacing between the spaced apart conductive elements 19 is approximately 0.075 mm. The multiconductor and support 10 is about 0.038 mm thick and the transverse dimension is 0.40 mm.

FIG. 13 is a cross sectional view of another form of the multiconductor and support 10 with the parallel spaced apart conductive elements 19 having a circular cross section and in a manner similar to FIG. 11 being adhesively bonded to a support means 20 in the form of a strip 41. In this alternate strip 41 and conductive elements 19 are also overcoated 45 with an insulative layer 45. The dimensions of the preferred configuration are in the range of 0.025 mm to 0.038 mm for the diameter of each conductive element 19 and the support means 20 is about 0.025 mm thick and about 0.40 mm wide. The transverse spacing between the spaced apart conductive elements 19 is approximately 0.075 mm. The thickness of the overcoat layer 45 is about 0.010 mm The multiconductor and support 10 is about 0.052 mm thick and the transverse dimension is 0.36 mm. The strip 41 and the overcoat 45 are shown with an added layer of metallizing on the outer surface for use as shielding 44 and depending on how the metallizing is applied the thickness of the multiconductor and support 10 will be increased.

Figure 14:
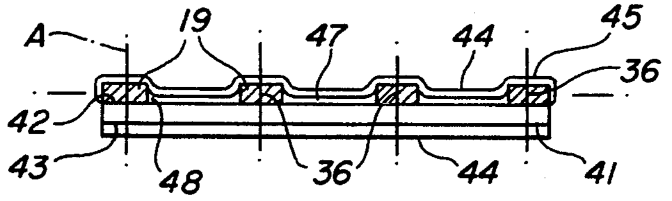
FIG. 14 is a view in cross section of another form of the multiconductor and support with the parallel spaced apart conductive elements having a rectangular cross section and in a manner similar to FIG. 12 being adhesively bonded to the support means in the form of a strip and also overcoated with an insulative layer.

FIG. 14 is a cross sectional view of another form of the multiconductor and support 10 with the parallel spaced apart conductive elements 19 having a rectangular cross section and in a manner similar to FIG. 12 being adhesively bonded to a support means 20 in the form of a strip 41. In this alternative the strip 41 and conductive elements 19 are overcoat with an insulative layer 45. The dimensions of the preferred configuration are in the range of 0.038 mm wide and 0.013 mm for each conductive element 19 and the support means 20 is about 0.025 mm thick and about 0.40 mm wide. The transverse spacing between the spaced apart conductive elements 19 is approximately 0.075 mm. The thickness of the overcoat layer 45 is about 0.010 mm. The multiconductor and support 10 is about 0.039 mm thick and the transverse dimension is 0.40 mm. The strip 41 and the overcoat layer 45 are shown with an added layer of metallizing on the outer surface for use as shielding 44 and depending on how the metallizing is applied the thickness of the multiconductor and support 10 will be increased.

Figure 15:
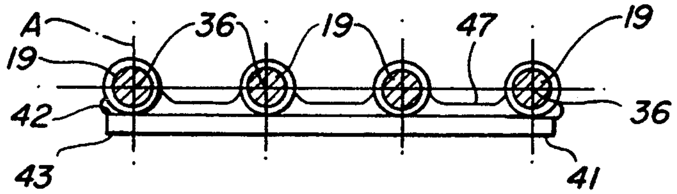
FIG. 15 is a view in cross section of another form of the multiconductor and support with the parallel spaced apart conductive elements having a circular cross section each separately insulated and then in a manner similar to FIG. 11 being adhesively bonded to the support means in the form of a strip.

FIG. 15 is a cross sectional view of another form of the multiconductor and support 10 with the parallel spaced apart conductive elements 19 each having a circular cross section wherein each is separately insulated and as in FIG. 13 each is adhesively bonded to a support means 20 in the form of a strip 41. In this alternative, the strip 41 and conductive elements 19 may be overcoat with an insulative layer 45. The dimensions of the preferred configuration are in the range of 0.025 mm to 0.05 mm for the diameter of each conductive element 19 and the support means 20 is about 0.025 mm thick and about 0.40 mm wide. The transverse spacing between the spaced apart conductive elements 19 is approximately 0.075 mm. The thickness of the overcoat 45 may be about 0.010 mm. The multiconductor and support 10 is about 0.050 mm thick and the transverse dimension is 0.36 mm.

Figure 16:
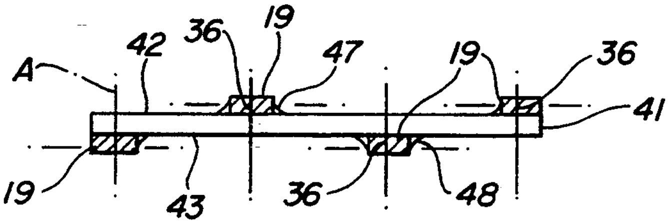
FIG. 16 is view in cross section of another form of the multiconductor and support with the parallel spaced apart conductive elements having a rectangular cross section being adhesively bonded to the support means in the form of a strip and also with conductive elements on opposite sides of the strip.

FIG. 16 is a cross sectional view of another form of the multiconductor and support 10 with the parallel spaced apart conductive elements 19 having a rectangular cross section and in a manner similar to FIG. 12 the conductive elements 19 are adhesively bonded to a support means 20 in the form of a strip 41 but also with conductive elements 19 on opposite surfaces 42 and 43 of the conductive strip 41. The dimensions of the preferred configuration are in the range of 0.038 mm wide to 0.013 mm thick for each conductive element 19 and the support means 20 is about 0.025 mm thick and about 0.40 mm wide. The transverse spacing between the spaced apart conductive elements 19 is approximately 0.075 mm. The multiconductor and support 10 is about 0.051 mm thick and the transverse dimension is 0.40 mm. While not specifically shown, the conductive elements 19 may have a circular cross section instead of rectangular and with that arrangement the thickness would increase.

Figure 17:
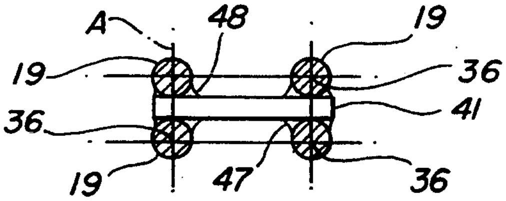
FIG. 17 is a view in cross section of another form of the multiconductor and support with the parallel spaced apart conductive elements having a circular cross section being adhesively bonded to the support means in the form of a strip and also with conductive elements on opposite sides of the strip but with the conductive elements across from each other to minimize the transverse dimension.

FIG. 17 is a cross sectional view of another form of the multiconductor and support 10 with the parallel spaced apart conductive elements 19 having a circular cross section and in a manner similar to FIG. 16 being adhesively bonded to a support means 20 in the form of a strip 41 with conductive elements 19 on opposite surfaces 42 and 43 of the strip 41. In this alternative the conductive elements 19 are positioned on the strip 41 across from each other to minimize the transverse dimension. The dimensions of the preferred configuration are in the range of 0.025 mm to 0.050 mm for diameter of each conductive element 19 and the support means 20 is about 0.025 mm thick and about 0.20 mm wide. The transverse spacing between the spaced apart conductive elements 19 is approximately 0.075 mm. The multiconductor and support 10 is about 0.075 mm thick and the transverse dimension is 0.20 mm. While not specifically shown, the conductive elements 19 may have a cross section rectangular instead of circular and with that arrangement the thickness would decrease.

Figure 18:
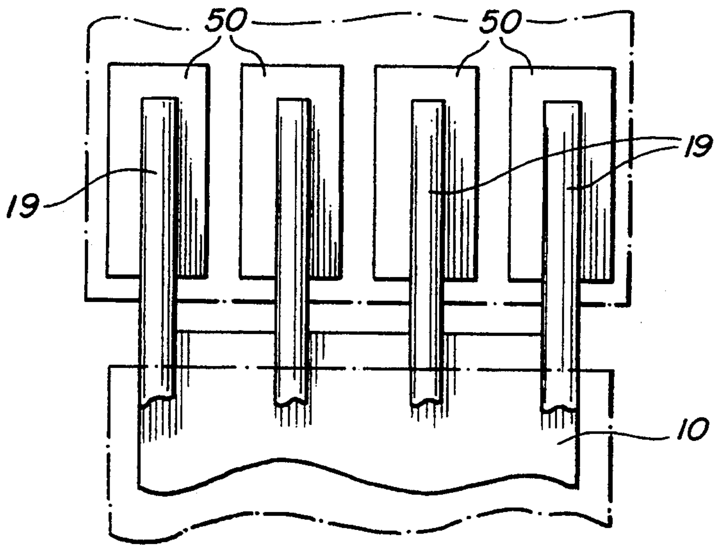
FIG. 18 is a partial top plan view of the termini of the multiconductor and support of the present invention illustrating a form of the spacing of the conductive elements and the relationship thereof to the bonding pads on a sensor.

The fixed, planar configurations of the multiconductor and support 10 disclosed herein allows for easy alignment and gang-bonding of the termini during wire attachment to the sensor. Also, since the conductive elements are fixed in space, rather than bundled, the "foot print" or "polarity" of the interconnect is maintained and time-consuming identification and manipulation of discrete wires avoided. Conventional wirebonding (thermo-compression, thermosonic and ultrasonic) of fine wires to microchips forces wires to immediately loop as they exit the bonding pads on the chip. This looped wire trajectory, when used in a sensing probe, causes the probe tip assembly to have a high profile (i.e. require a larger lumen). Turning now to FIG. 18, a partial top plan view of the distal end 38 of the multiconductor and support 10 of the present invention, illustrating a form of the spacing of the conductive elements 19 and the relationship thereof to the bonding sites 50 or pads on the sensor. The multiconductors and support 10 are made most preferably on the machine 18 as described and by a method as will be described herein. After completion of the pair 29, they are severed to separate them into an individual part 28 of up to several centimeters or longer. The relationship of the distance between the center lines 36 and the width of one of the conductive elements 19 is about three to one in FIG. 18.

Figure 19:
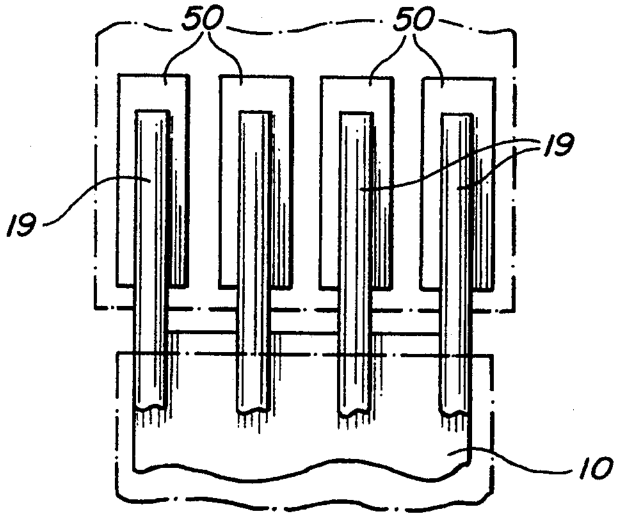
FIG. 19 a partial top plan view of the termini of the multiconductor and support of the present invention illustrating another form of the spacing of the conductive elements and the relationship thereof to the bonding pads of a sensor.

FIG. 19, a partial top plan view of the distal end 38 of the multiconductor and support 10 of the present invention, illustrates another form of the spacing of the conductive elements 19 and the relationship thereof to the bonding sites 50 or pads on a sensor. The dimensions of this configuration are in the range of 0.025 mm to 0.038 mm in width for each conductive element and the support means 20 is about 0.025 mm thick and about 0.40 mm wide. The transverse spacing between the spaced apart conductive elements 19 is approximately 0.075 mm. This transverse spacing may be identical to the spacing of bonding sites 50 on sensor 13. The relationship of the distance between the center line 36 and the width of one of the conductive elements 19 is about two to one.

Figure 20:
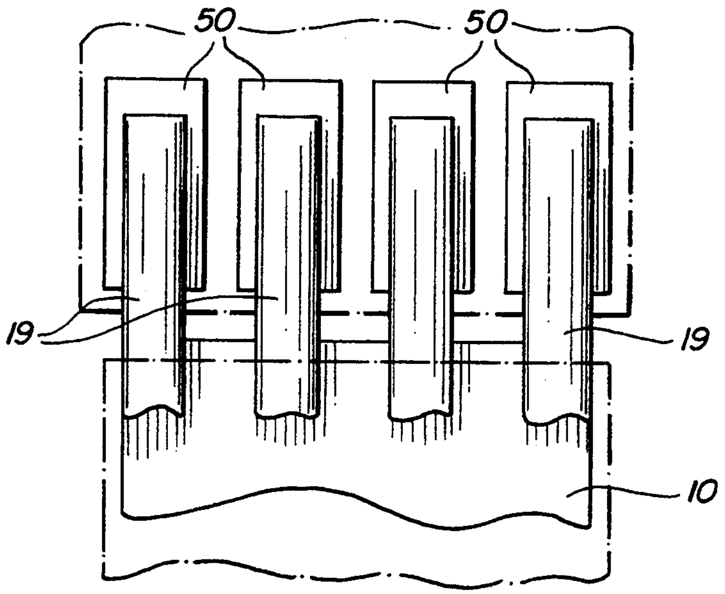
FIG. 20 is a partial top plan view of the termini of the multiconductor and support of the present invention illustrating another form of the spacing of the conductive elements and the relationship thereof to bonding pads of a sensor.

FIG. 20 is a partial top plan view of the distal end 38 of the multiconductor and support 10 of the present invention illustrating another alternative form of the spacing of the conductive elements 19 and the relationship thereof to the bonding sites 50 or pads on the sensor. The dimensions of this configuration are in the range of 0.025 mm to 0.050 mm in width for each conductive element and the support means 20 is about 0.025 mm thick and about 0.40 mm wide. The transverse spacing between the spaced apart conductive elements 19 is approximately 0.050 mm. This transverse spacing may be identical to the spacing of bonding sites 50 on the sensor 13. The relationship of the distance between the center line 36 and the width of one of the conductive elements 19 is about one to one.

Figure 21:
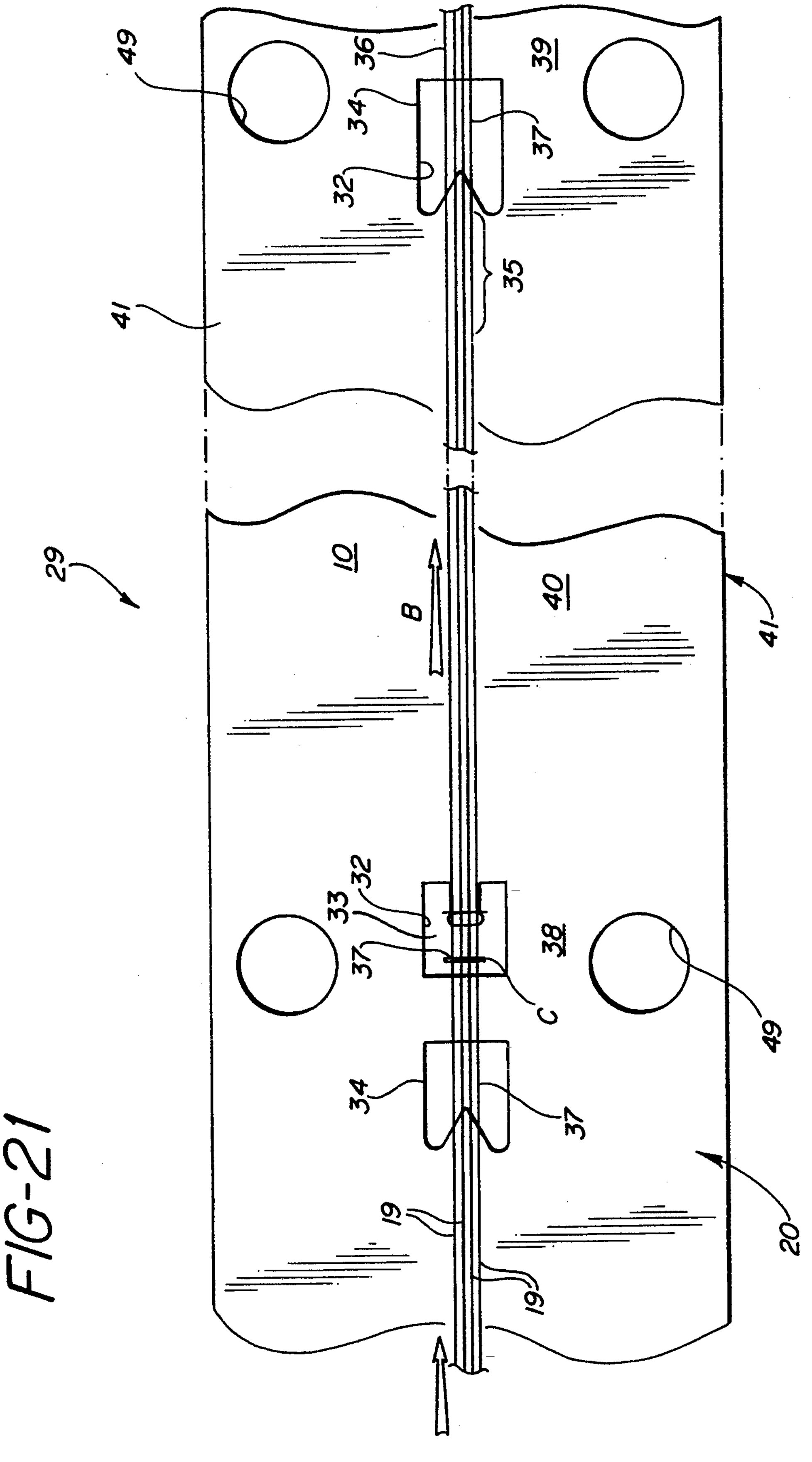
FIG. 21 is a partial top plan view of the preferred support means in the form of a strip with the openings across which the conductive elements pass.

FIG. 21 is a partial top plan view of the preferred support means 20 in the form of the strip 41 with the openings 32 across which the conductive elements 19 pass when assembled to the strip 41. The openings 32 are important for various purposes. Initially openings 32 are punched, laser burned or cut into the strip 41 by the means for making openings 31 at periodic spaced intervals with a very exact dimension between each thus locating the beginning or distal end of the completed multiconductor and support 10. It is important to note, however, that depending upon where the pair 29 is cut the length thereof will be determined. This stage of the strip 41 configuration is not shown since the initial openings 32 are merely square and are located longitudinally relative to additional openings 49 already in the tape along the edges. Additional openings 49 are provided for transporting the strip 41 in the well known manner of photographic film with a sprocket drive. The initial opening 32 is reshaped and increased in size as shown in FIG. 21 at the place 33. Another opening is placed at the proximal end 39 at the other place 34 which is, in the direction of arrow B, relative to the reshaped initial opening 32. Openings 32 define the location of the sensor 13 relative to the multiconductor and support 10.

Figure 22:
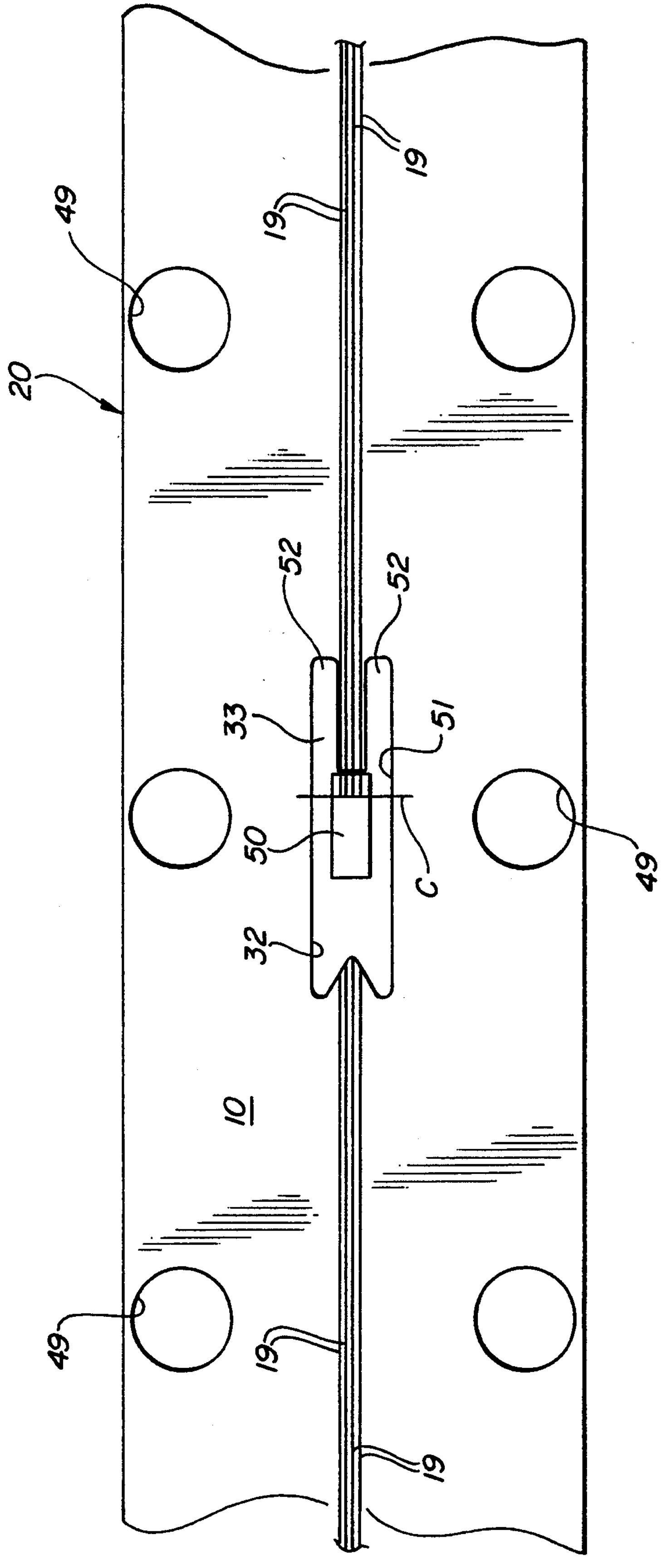
FIG. 22 is a partial top plan view of the preferred support means in the form of a strip having enlarged openings across which the conductive elements pass enlarged cut lines for the trimming the width to the final size.

FIG. 22 is a partial top plan view of the preferred support means 20 in the form of strip 41 with the reshaped initial opening 32 and the other opening at the other place 34 enlarged into an enlarged opening 51 to provide guidance for locating a cut line labelled C for the trimming of the width to the final size. The conductive elements 19 are shown for purposes of illustration to provide an idea of the relative scale and positions of the openings 32 and width of the strip 41 before trimming. The conductive elements 19 are, as described in detail herein assembled after the steps of preparing the strip 41 as explained in connection with FIGS. 21 and 22. In a like manner the sensor 13 is shown as part of FIG. 22 even though it is not attached to the conductive elements 19 at this point in the development of the strip 41. The reshaped and other openings 32 are connected when the enlarged opening 51 is formed in the strip 41. As shown in FIG. 22 the enlarged opening 51 has trim guide slots 52 provided to be used in the alignment of the cutting along the sides of the conductive elements 19 to obtain the final width of the multiconductor and support 10.

In the preferred embodiment shown in FIG. 22 the conductive elements 19 are transversely cut across the middle of the enlarged opening 51 to define a single multiconductor and support 10. The cut line labelled C in FIGS. 21 and 22 is the approximate location of the transverse cut of the conductive elements 19. The sensor is attached at the bonding sites 50 as described and results in the pair 29 as shown in FIGS. 18 through 22 but for the fact that when the pair 29 has been severed and the distal end 38 of the strip 41 has been separated. The conductive elements 19 which are proximal are preferably left overlying the strip 41 and unbonded with a slight amount or no part thereof unsupported. That arrangement aids in the handling of the multiconductor and support 10 during threading through the catheter lumen of tube 15 and the subsequent connection.

Figure 23:
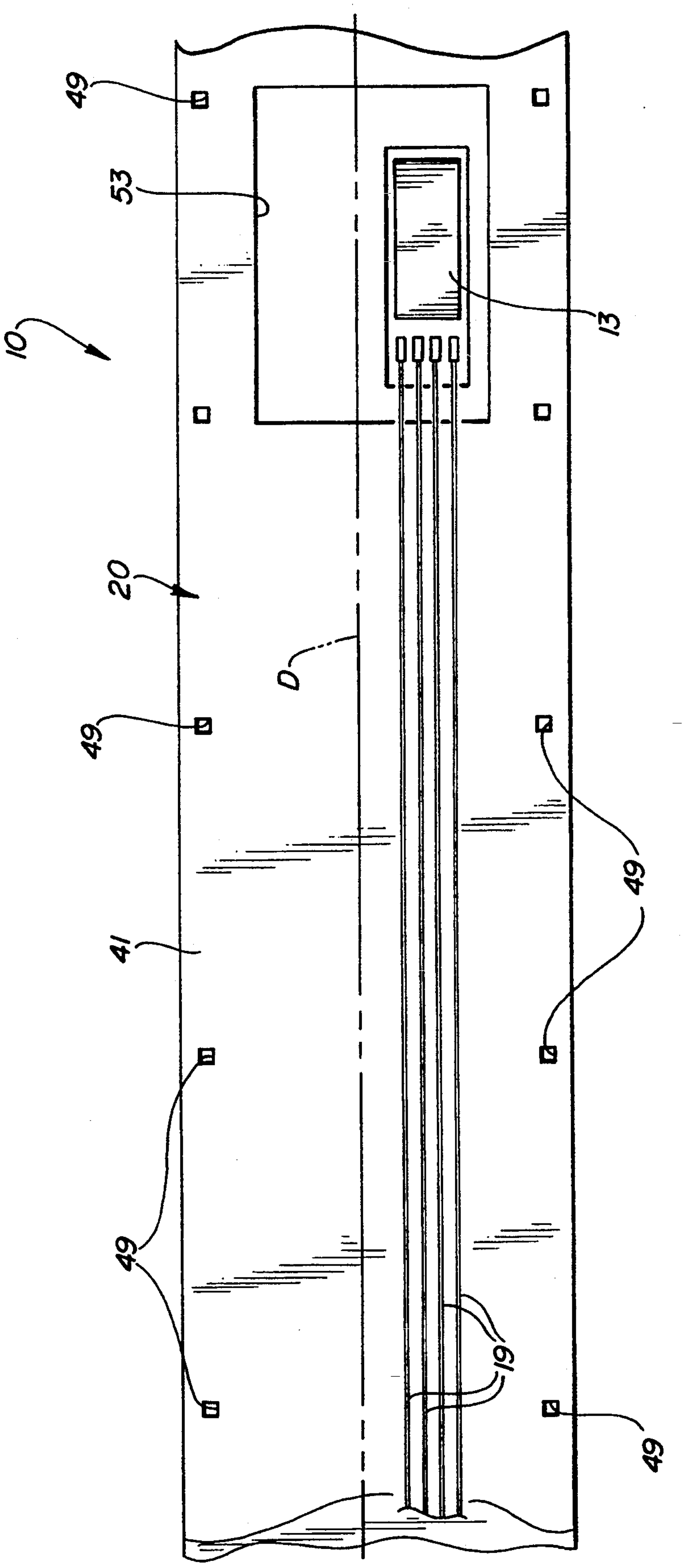
FIG. 23 is a partial top plan view of an alternate embodiment of the multiconductor and support shown attached to a sensor also carried by the support means.
Figure 24:
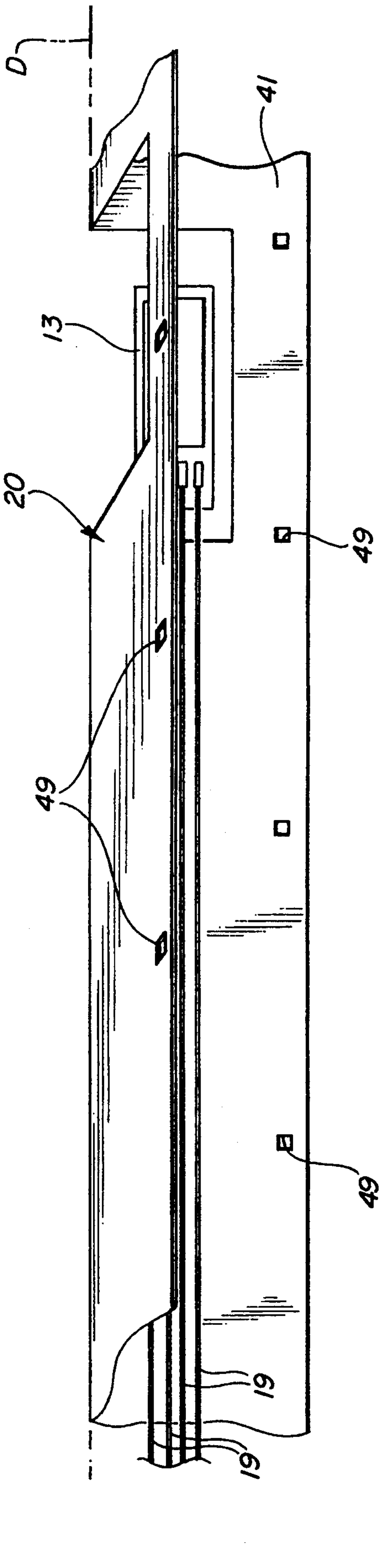
FIG. 24 is a partial top plan view of the multiconductor and support of FIG. 23 which is shown being folded over.

FIG. 23 is a partial top plan view of an alternate embodiment of the multiconductor and support 10 shown with the sensor 13 and conductive elements 19 carried by the support means 20. In this configuration the additional openings 49 for the sprocket drive are square and a bonding window 53 is rectangular. The strip 41 is a double width and as will be explained is designed to be folded over the conductive elements 19 and sensor 13 about a line D. FIG. 24 is a partial top plan view of the multiconductor and support 10 of FIG. 23 with the attached sensor 13 included therein. The support means 20 is shown being folded over.

Figure 25:
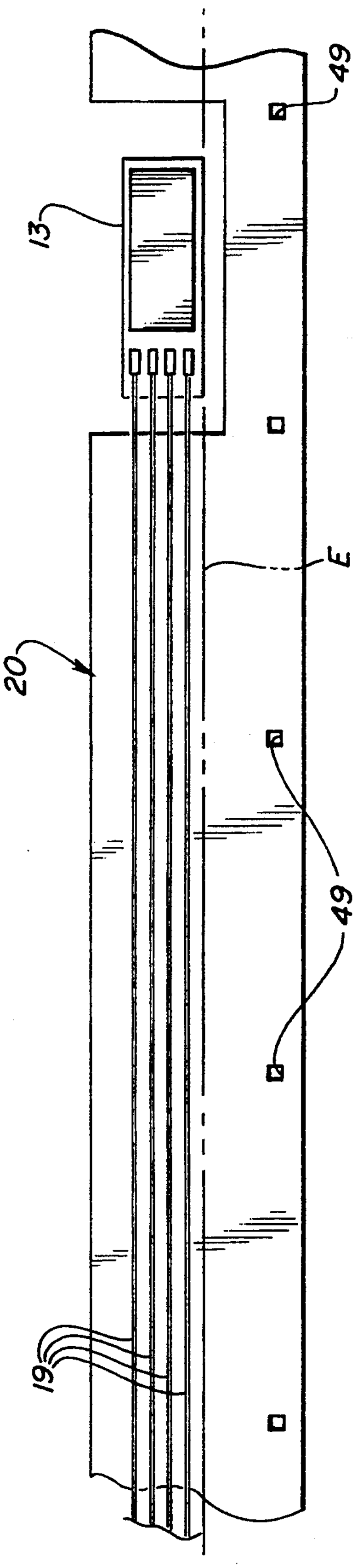
FIG. 25 is a top plan view of the multiconductor and support of FIG. 23 completely folded over and ready for longitudinal trimming.

FIG. 25 is a top plan view of the multiconductor and support 10 of FIGS. 23 and 24 completely folded over and ready for longitudinal trimming. While the trimmed pair 29 is not specifically shown, the line E in FIG. 25 indicates the preferred location of the longitudinal cut used to sever the excess portion having the additional openings 49 of the support means 20. It should be appreciated that the openings 32 used for registration are also useful for positioning the cut location.

A method for assembling the multiconductor and support 10 is also a part of the invention. The method preferably includes the steps of intermittently moving several conductive elements 19 in parallel spaced relation in the plane 24, intermittently moving the support means 20 positioned parallel to the plane 24 of the conductive elements 19 and pressing the parallel conductive elements 19 and the support means 20 together to form the pair 29. The step of intermittently moving the support means 20 in the plane 24 parallel to the conductive elements 19 is performed by the step of intermittently feeding the support means 20 by dispensing from the spool or roll 21 of polymer tape. The step of intermittently feeding by dispensing the polymer tape may include the step of first making additional openings 49 in the strip 41 for providing registration for handling. The step of making additional openings 49 includes the step of locating the openings 32 relative to the distal ends 38 of the conductive elements 19 so that there are portions of the conductive elements 19 unsupported for connection to the sensor 13 after the pair 29 is formed.

An additional step of pressing takes place when the conductive elements 19 and the support means 20 are periodically motionless and are in their respective parallel relationship. The step of intermittently moving the conductive elements 19 in parallel spaced relation relative to one another is performed by the added step of guiding the conductive elements 19 from a plurality of spools 21 into parallel spaced relation to one another. The step of pressing is most preferably performed by reciprocating the platten 30 toward the flat surface 26 to compress the conductive elements 19 and support means 20 therebetween to form the pair 29. The step of heating the platten 30 or the surface 26 is used for activating adhesive 47 on the support means 20 for securing the conductive elements 19. The method step of pressing may merely include heating a heat activated adhesive 47 such as a hot melt wax carried on the support means 20.

An additional step of severing an individual pair 29 of conductive elements 19 and support means 20 is a part of the preferred method. The severing takes place, along the cut line C shown in FIGS. 21 and 22. An additional step of overcoating the conductive elements 19 to form insulative layer 45 is performed if desired. The added step of severing the pair 29 transversely across the openings 32 and across the conductive elements 19 leaves the distal end 38 of the conductive elements 19 unsupported by the support means 20. In order to complete an alternate form of the multiconductor and support 10 added steps of longitudinally folding the support means 20 in the form of a polymer tape to overlie the conductive elements 19 and thereafter longitudinally trimming excess tape to reduce the transverse dimension of the pair 29 are performed. The step of making openings 32 for registration of the tape relative to the conductive elements 19 includes the later step of using the additional openings 49 for alignment of the tape while trimming the transverse dimension of the pair 29.

The preferred multiconductor and support 10 of the present invention is part of an in vivo catheter tip pressure transducer as described in connection with FIG. 1. The multiconductor and support 10 is fed through the catheter lumen to make the sensor tip assembly 11 with an overall size small enough to be placed within a 20 gauge catheter. The multiconductor and support 10 as described herein is attached to the sensor 13 and the combination passes through the catheter lumen to transmit signals from the tip of the catheter to the interface. In particular the preferred combination is prepared in accordance with FIGS. 22 to 24.

What is claimed is:

1. A machine for assembly of a multiconductor and support useful for transmitting signals through a catheter comprising:

a plurality of spools on parallel axes, each spool having a supply of a conductive element wrapped thereabout;

a plurality of guides positioned wherein each of the guides being associated with one spool of the plurality of spools, each guide positioned to receive the supply of the conductive element from its respective spool and to position each of the conductive elements therefrom to pass in a plane with intermittent movement thereby providing a section of the conductive elements to overlie a flat surface and be spaced therefrom, the guide for each spool arranged to position the sections of each conductive element spaced from and parallel to sections of conductive elements from other guides and all the supplied conductive elements being thereby spaced from and overlying the flat surface;

means for transporting support means from a supply of support means between the plane of the conductive elements and above the flat surface, the support means being moved intermittently but synchronously with the parallel conductive elements thereabove so that a part of the support means and the conductive elements are periodically motionless and in registration with each other forming a pair; and a platten disposed above the conductive elements and over the flat surface, the platten being mounted for reciprocal motion to and from the pair during a quiescence intermittent to the movement of the pair for compressing the pair against the flat surface thereby bonding the conductive elements and the support means into the multiconductor and support.

2. The machine of claim 1 wherein the platten is heated and the support is a polymer tape with a heat activated adhesive.

3. The machine of claim 1 wherein the spools are biased to maintain a predetermined tension on the conductive elements and the support means includes openings permitting precision alignment to guide the support means.

4. The machine of claim 3 wherein said support means further includes a plurality of other and reshaped openings generally aligned with and below said conductive elements, said other and reshaped openings thereby providing an area where said conductive elements are unsupported.

5. The machine of claim 4 wherein a cutter is arranged to substantially transversely sever the place where the conductive elements are unsupported for making an individual multiconductor and support.

6. A method for assembling a multiconductor and support including the following steps:

intermittently moving several conductive elements in parallel spaced relation in a plane;

intermittently moving a support means in another plane positioned parallel to the plane of the conductive elements; and pressing the parallel conductive elements and the support means together to form a pair thereof when the conductive elements and the support means are periodically motionless and are in their respective planes.

7. The method of claim 6 with the additional step of severing individual assemblies of conductive elements and support means.

8. The method of claim 6 wherein the step of pressing includes a substep of heating a heat activated adhesive carried on the support means.

9. The method of claim 6 with an additional step of overcoating the conductive elements to form an insulative layer.

10. The method of claim 6 wherein the step of pressing is performed by reciprocating a platten toward a flat surface for compressing the conductive elements and the support means therebetween to form the pair.

11. The method of claim 10 wherein the step of heating the platten is used for activating adhesive on the support means for securing the conductive elements.

12. The method of claim 6 wherein the step of intermittently moving the conductive elements in parallel spaced relation relative to one another is performed by guiding the conductive elements from a plurality of spools into the parallel spaced relation.

13. The method of claim 6 wherein the step of intermittently moving the support means in a plane parallel to the parallel and spaced conductive elements is performed by intermittently feeding the support means by dispensing the support means from a roll of polymer tape.

14. The method of claim 13 wherein the step of intermittently feeding by dispensing the roll of polymer tape includes the step of first making openings in the tape.

15. The method of claims 14 wherein the step of making openings includes locating the openings in a parallel space relation with proximal and distal termini of the conductive elements for providing registration for the handling of the tape and leaving at least the distal termini of the conductive elements unsupported.

16. The method of claims 15 with the added step of severing the pair transversely across the openings and unsupported distal termini of the conductive elements for leaving the conductive elements unsupported by the tape and exposed for connection.

17. The method of claim 14 with the added step of folding the polymer tape longitudinally to overlie the conductive elements and thereafter a step of longitudinally trimming excess tape to reduce the transverse dimension of the pair.

18. The method of claims 14 wherein the step of making openings includes enlarging the openings for alignment of the tape for trimming the transverse dimension of the pair.

* * * * *